(12) United States Patent
Jayaraman et al.

(10) Patent No.: US 10,530,256 B1
(45) Date of Patent: Jan. 7, 2020

(54) MULTI-LEVEL BUCK CONVERTER WITH REVERSE CHARGE CAPABILITY

(71) Applicant: Dialog Semiconductor (UK) Limited, London (GB)

(72) Inventors: Karthik Jayaraman, Chandler, AZ (US); Lasse Harju, Tampere (FI)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/206,327

(22) Filed: Nov. 30, 2018

(51) Int. Cl.
*H02M 1/08* (2006.01)
*H02M 3/158* (2006.01)
*H02J 7/35* (2006.01)
*H02M 3/335* (2006.01)

(52) U.S. Cl.
CPC .............. *H02M 3/1582* (2013.01); *H02J 7/35* (2013.01); *H02M 3/1584* (2013.01); *H02M 3/33584* (2013.01)

(58) Field of Classification Search
CPC .. H02M 3/1582; H02M 3/33584; H02M 1/32; H02M 2001/0009; H02J 7/35; H02J 7/022
USPC ................. 323/222, 224, 235, 271.282, 311; 320/140, 145, 162, 164
See application file for complete search history.

(56) References Cited

U.S. PATENT DOCUMENTS

| | | | |
|---|---|---|---|
| 6,031,702 A | 2/2000 | Williams | |
| 7,292,462 B2 * | 11/2007 | Watanabe | H02M 3/07 307/110 |
| 8,498,089 B2 * | 7/2013 | Lorentz | G01R 19/0092 323/277 |
| 9,160,232 B2 | 10/2015 | Thomas et al. | |
| 9,793,804 B2 | 10/2017 | Zhang et al. | |
| 9,929,653 B1 * | 3/2018 | Mercer | H02M 3/158 |
| 10,075,064 B2 * | 9/2018 | Perreault | H02M 1/4208 |

(Continued)

FOREIGN PATENT DOCUMENTS

DE    11 2016 004 202 T5    6/2018

OTHER PUBLICATIONS

Co-pending U.S. Appl. No. 16/050,746, filed Jul. 31, 2018, "Milti-level Power Converter with Light Load Flying Capacitor Voltage Regulation", by Aravind Mangudi et al., 35 pages.

(Continued)

*Primary Examiner* — Rajnikant B Patel
(74) *Attorney, Agent, or Firm* — Saile Ackerman LLC; Stephen B. Ackerman

(57) ABSTRACT

Power converters and method with reverse charge capability are presented. A power converter operates either in a buck mode for transferring electrical power from a first terminal of the power converter to a second terminal of the power converter, or in a boost mode for transferring electrical power from the second terminal of the power converter to the first terminal of the power converter. The power converter has several switching elements, a flying capacitor, an inductor, and a control unit. The switching elements couple the first terminal of the power converter and the flying capacitor, couple the first terminal of the flying capacitor and a first terminal of the inductor, couple the first terminal of the inductor and a second terminal of the flying capacitor and couple the second terminal of the flying capacitor and a reference potential. The control unit controls the switching elements.

26 Claims, 7 Drawing Sheets

(56) References Cited

U.S. PATENT DOCUMENTS

| | | |
|---|---|---|
| 2008/0079410 A1 | 4/2008 | Ishii et al. |
| 2008/0157723 A1* | 7/2008 | Xing ................ H02J 7/0068 320/164 |
| 2009/0010035 A1 | 1/2009 | Williams |
| 2014/0266135 A1* | 9/2014 | Zhak ................ H02M 1/36 323/311 |
| 2016/0118886 A1* | 4/2016 | Zhang ............... H02M 3/158 323/271 |
| 2018/0183333 A1 | 6/2018 | Uenaka et al. |

OTHER PUBLICATIONS

"Development of High Power Density Flying Capacitor Multi-level Converters with Balanced Capacitor Voltage," by Hidemine Obara et al., 2012 IEEE Energy Conversion Congress and Exposition (ECCE), Sep. 15-20, 2012, pp. 330-336.

"Capacitor Voltage Balancing Control of Multilevel DC-DC Converter," by Levy F. Costa et al., 2013 Brazilian Power Electronics Conference, Oct. 27-31, 2013, pp. 332-338.

"Design and Control of Fault-Tolerant Nonisolated Multiphase Multilevel DC-DC Converters for Automotive Power Systems," by Michael Gleissner et al., IEEE Transactions on Industry Applications, vol. 52, No. 2, Mar./Apr. 2016, pp. 1785-1795.

German Office Action, File No. 10 2019 200 112.2, Applicant: Dialog Semiconductor (UK) Limited, dated Aug. 29, 2019, 6 pages and English translation, 7 pages.

\* cited by examiner

MULTI-LEVEL BUCK CONVERTER WITH REVERSE CHARGE CAPABILITY

TECHNICAL FIELD

The present document relates to power converters. In particular, the present document relates power converters capable of transferring, in a first mode, electrical power from a first terminal of the power converter to a second terminal of the power converter, and transferring, in a second mode, electrical power from the second terminal to the first terminal.

BACKGROUND

System level specifications for power converters have become increasingly stringent in the last years. This is especially the case with regard to power converters used in portable electronic devices. On the one hand, power converter operating efficiency is critical as it has a direct influence on battery lifetime as well as power density and the related form factor of the portable electronic device. On the other hand, the power converter must not only provide operating power for the device but must also provide a regulated output to manage battery charging functions.

Moreover, modern power converters are also required to be bidirectional, i.e. such power converters may not only transform power from a wall adapter to a battery of an electronic device in a forward direction. Depending on the circumstances, it may also be required that such power converters are capable of transforming electric power also in the opposite direction, i.e. from the battery of the electronic device to an external Universal Serial Bus USB device. This functionality is also known as USB On-The-Go OTG.

SUMMARY

The multi-level power converter topology such as e.g. the multi-level buck converter is a promising approach to alleviate many of the shortcomings of conventional power converter topologies. In a multi-level buck converter, for example, two high-side switches connected in series replace the single high-side switch of the traditional buck converter. Moreover, two low-side switches connected in series replace the single low-side switch of the traditional buck converter and a so-called flying capacitor is connected in parallel to the series connection of the lower high-side switch and the higher low-side switch.

A major advantage of the multi-level buck converter is that the root mean square RMS voltage on the inductor node is only 50% of the corresponding voltage of a traditional buck converter. In addition to reducing the RMS voltage across and the RMS current though the inductor, the voltages across the switching capacitors is also reduced, thus lowering switching losses. Furthermore, transistors with lower breakdown voltage ratings typically have lower drain-source resistances Rds, resulting in reduced conductive losses.

The present document addresses the above mentioned technical problems and relates to novel ways of implementing and controlling a bidirectional power converter which is capable of transferring, in a first mode, electrical power in a forward direction from a first terminal of the power converter to a second terminal of the power converter, and transferring, in a second mode, electrical power in a backwards direction from the second terminal to the first terminal. In particular, it is an objective of the present document to provide an improved bidirectional power converter with an overcurrent protection mechanism.

According to an aspect, a power converter is presented which is configured to operate either in a buck mode for transferring electrical power from a first terminal of the power converter to a second terminal of the power converter, or in a boost mode for transferring electrical power from the second terminal of the power converter to the first terminal of the power converter. The power converter may comprise a first switching element, a second switching element, a third switching element, a fourth switching element, a flying capacitor, an inductor, and a control unit. The first switching element may be coupled between the first terminal of the power converter and a first terminal of the flying capacitor. The second switching element may be coupled between the first terminal of the flying capacitor and a first terminal of the inductor. The third switching element may be coupled between the first terminal of the inductor and a second terminal of the flying capacitor. The fourth switching element may be coupled between the second terminal of the flying capacitor and a reference potential. Finally, the control unit may be configured to control the switching elements.

Each of the four switching elements may be implemented with any suitable device, such as, for example, a metal-oxide-semiconductor field effect transistor MOSFET, an insulated-gate bipolar transistor IGBT, a MOS-gated thyristor, or other suitable power devices. Each switching element may have a gate to which a respective driving voltage or control signal may be applied to turn the switching element on (i.e. to close the switching element) or to turn the switching element off (i.e. to open the switching element).

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may related to different physical contacts although reference is made to "the" reference potential for ease of presentation.

In the buck mode, the power converter may be configured to transform a higher input voltage at the first terminal of the power converter into a lower output voltage at the second terminal of the power converter. That is, the power converter may operate as a regular buck power converter in a forward direction. For example, the power converter may be used in a portable electronic device and receive the higher input voltage at its first terminal e.g. from an external travel adapter which is performing an AC/DC conversion. The power converter may then provide a (lower) regulated output voltage or a (lower) regulated output current at its second terminal e.g. for charging an internal battery of the portable electronic device or for supplying a stable supply voltage to the portable electronic device.

The other way around, in the boost mode, the power converter may be configured to transform a lower input voltage at the second terminal of the power converter into a higher output voltage at the first terminal of the power converter. That is, the power converter may operate as a regular boost power converter in a backwards direction. Integrated in the above-described portable electronic device, the same power converter may e.g. receive the lower input voltage at the second terminal of the power converter from an internal battery of the portable electronic device and provide a (higher) regulated output voltage or a (higher) regulated output current to an external device such as e.g. an external Universal Serial Bus USB device. The described backwards or reverse charge capability is commonly referred to as USB On-The-Go OTG boost. Thus, one advantage of the presented power converter is that both the buck mode as well as the boost mode may be implemented in a single power converter.

As a further advantage, a multi-level power converter architecture is proposed for implementing a power converter with reverse charge capability. At this, the name "multi-level" refers to the fact the four switching elements are capable of creating at least two voltage levels different from the voltage at the reference potential at the first terminal of the inductor. Said first terminal of the inductor is sometimes also denoted as the switching node of the power converter. Compared to a conventional buck converter with a single high side switching element and a single low side switching element, the presented multi-level power converter with four switching elements shows the advantages of substantially reduced switching losses as well as substantially reduced conductive losses.

A second terminal of the inductor may be coupled to the second terminal of the power converter. The power converter may comprise a first capacitator coupled between the first terminal of the power converter and the reference potential. This first capacitor may serve as output capacitor for stabilizing the output voltage at the first terminal of the power converter in the boost mode. Also, the first capacitor may serve as input capacitor for stabilizing the input voltage at the first terminal of the power converter in the buck mode. The power converter may comprise a second capacitator coupled between the second terminal of the power converter and the reference potential. This second capacitor may serve as output capacitor for stabilizing the output voltage at the second terminal of the power converter in the buck mode.

On the one hand, the power converter may comprise a buck feedback circuit for coupling the control unit with the second terminal of the power converter, wherein the control unit is configured to regulate, when the power converter operates in the buck mode, an output voltage or an output current at the second terminal of the power converter in the buck mode. The buck feedback circuit may e.g. comprise an error amplifier configured to generate an error signal based on a reference value and an output signal indicative of the output voltage or the output current at the second terminal of the power converter. Further, the buck feedback circuit may e.g. comprise a pulse width modulation PWM unit or a pulse frequency modulation PFM unit for translating the generated error signal in a sequence of pulses with corresponding duration and/or frequency for controlling the switching elements.

For example, the control unit may be configured to regulate said output voltage or said output current at the second terminal of the power converter by controlling all four switching elements such that each switching element is turned on and off according to a pre-determined schedule. Alternatively, the control unit may be configured to regulate said output voltage or said output current by turning the second switching element on and off and by turning the third switching element on and off. To be more specific, the control unit may be configured to regulate said output voltage or said output current by turning on and off only the second and third switching element. Simultaneously, the control unit may be configured to turn on the first switching element and the fourth switching element when the power converter operates in the buck mode. In other words, the control circuit may be configured—while in the buck mode—to permanently turn on the first and the fourth switching element while—at the same time—the control circuit may be configured to turn the second and third switching element on and off in order to regulate said output voltage or said output current. In this way, the flying capacitor is permanently coupled between the first terminal of the power converter and the reference potential. Put in a different way, the flying capacitor is coupled in parallel to the first capacitor, thereby increasing the effective capacitance of said first capacitor and ultimately improving the power converter's ability to stabilize the input voltage at its first terminal in the buck mode. In yet other words, the flying capacitor of the multi-level power converter may be used as an input capacitor in the buck mode.

In summary, the control unit may be configured to temporarily turn on both the first and the fourth switching element such that the flying capacitor becomes available as an (additional) input capacitor and/or as an (additional) output capacitor of the power converter.

On the other hand, the power converter may comprise a boost feedback circuit for coupling the control unit with the first terminal of the power converter, wherein the control unit is configured to regulate an output voltage or an output current at the first terminal of the power converter when the power converter operates in the boost mode. The boost feedback circuit may e.g. comprise an error amplifier configured to generate an error signal based on a reference value and an output signal indicative of the output voltage or the output current at the first terminal of the power converter in the boost mode. Further, the boost feedback circuit may e.g. comprise a pulse width modulation PWM unit or a pulse frequency modulation PFM unit for translating the generated error signal in a sequence of pulses with corresponding duration and/or frequency for controlling the switching elements.

For example, the control unit may be configured to regulate said output voltage or said output current at the first terminal of the power converter by controlling all four switching elements such that each switching element is turned on and off according to a pre-defined schedule. Alternatively, the control unit may be configured to regulate said output voltage or said output current by turning the second switching element on and off and by turning the third switching element on and off. More specifically, the control unit may be configured to regulate said output voltage or said output current by turning on and off only the second and third switching element. Simultaneously, the control unit may be configured to turn on the first switching element and the fourth switching element when the power converter operates in the boost mode.

In other words, the control circuit may be configured—while in the boost mode—to permanently turn on the first and the fourth switching element while—at the same time—the control circuit may be configured to turn the second and third switching element on and off in order to regulate said output voltage or said output current. In this way, the flying capacitor is permanently coupled between the first terminal of the power converter and the reference potential. Put in a different way, the flying capacitor is coupled in parallel to the first capacitor, thereby increasing the effective capacitance of said first capacitor and ultimately improving the power converter's ability to stabilize the output voltage at its first terminal in the boost mode. In yet other words, the flying capacitor of the multi-level power converter may be used as an output capacitor in the boost mode.

The power converter may comprise a current sensing means arranged on a current path between the first terminal of the power converter and the second terminal of the power converter. In particular, the current sensing means may be arranged on a current path between the first terminal of the power converter and the first terminal of the inductor. As a first example, the current sensing means may comprise a resistor. For instance, said resistor may be a shunt resistor arranged on a current path between the first terminal of the power converter and the first switching element. Using a simple resistor to measure a current through the power converter is an efficient and low-loss way to implement a current measurement for implementing an overcurrent protection. The resistor may be constructed from the integrated circuit IC's metal layers and, thus, may exhibit a very low resistance value and very low power losses compared to alternative solutions which require e.g. transistor to measure a corresponding current. Furthermore, the area required for a resistor may be reduced compared to solutions based on transistors.

As a second example, the current sensing means may be the first switching element. As the first switching element may be turned on permanently such that the flying capacitor can be used as an input capacitor or output capacitor (depending on the current mode of the power converter), the current through said first switching element may be measured with high precision as the amount of noise is substantially reduced compared to solutions in which current measurements are obtained from a switching element which is repeatedly turned on and off.

As already mentioned, the control unit may be configured to detect, based on a sense signal generated by the current sensing means, a short circuit situation, and in response to said detection, to turn off the second switching element. In this way, the first terminal of the power converter is isolated from the second terminal of the power converter e.g. to prevent damage of a battery connected to said second terminal in case of an overcurrent at said first terminal.

Moreover, the second switching element may comprise a field-effect transistor FET and a back-body switch configured to connect a back-body of said FET with a reference potential when said short circuit situation is detected. More specifically, the control circuit may be configured to control the back-body switch such that it connects the back-body of the FET with the reference potential when said short circuit situation is detected. When no short circuit situation is detected, said back-body switch may be configured to connect the back-body of the FET with a source terminal of said FET. The back-body of the transistor implementing the second switching element may also be denoted as body, base, bulk, or substrate. By coupling the back-body of the second switching element to the reference potential (e.g. ground), a current flowing over the body-diode of the second switching element may be substantially reduced. As a result, it becomes possible to use the second switching element as a means for interrupting current flow through the power converter in an overcurrent situation. Consequently, it becomes possible to use the above-described simple resistor as an efficient current sensing means as opposed to having back to back FETs (see FIGS. 4 S3 and S4) which will significantly increase the silicon area. The flying capacitor therefore serves as the input capacitance in buck mode or output capacitance in boost mode without mandating the need for FETs S3 and S4 and still abiding by the USB Power Delivery 3.0 standards.

According to another aspect, a method for operating a power converter is described. The method may comprise steps which correspond to the features of the power converter described in the present document. To be more specific, the method may comprise providing a first switching element, a second switching element, a third switching element, a fourth switching element, a flying capacitor, an inductor, and a control unit within the power converter. The method may comprise operating the power converter in a buck mode for transferring electrical power from a first terminal of the power converter to a second terminal of the power converter or operating the power converter in a boost mode for transferring electrical power from the second terminal of the power converter to the first terminal of the power converter. In addition, the method may further comprise coupling the first switching element between the first terminal of the power converter and a first terminal of the flying capacitor, and coupling the second switching element between the first terminal of the flying capacitor and a first terminal of the inductor. The method may further comprise coupling the third switching element between the first terminal of the inductor and a second terminal of the flying capacitor, coupling the fourth switching element between the second terminal of the flying capacitor and a reference potential, and controlling, by the control unit, the switching elements.

The method may further comprise coupling the control unit with the second terminal of the power converter using a buck feedback circuit, and regulating, when the power converter operates in the buck mode, an output voltage or an output current at the second terminal of the power converter. The method may further comprise regulating said output voltage or said output current by turning the second switching element on and off and by turning the third switching element on and off. The method may further comprise turning on the first switching element and the fourth switching element when the power converter operates in the buck mode.

The method may further comprise coupling the control unit with the first terminal of the power converter using a boost feedback circuit, and regulating an output voltage or an output current at the first terminal of the power converter when the power converter operates in the boost mode. The method may further comprise regulating said output voltage or said output current by turning the second switching element on and off and by turning the third switching element on and off. The method may further comprise turning on the first switching element and the fourth switching element when the power converter operates in the boost mode.

The method may further comprise providing a current sensing means arranged on a current path between the first terminal of the power converter and the second terminal of the power converter. At this, the current sensing means may comprise a resistor.

Alternatively, or additionally, the current sensing means may be the first switching element. The method may further comprise detecting, based on a sense signal generated by the current sensing means, a short circuit situation, and in response to said detection, to turn off the second switching element. The second switching element may comprise a field-effect transistor FET and a back-body switch. And the method may further comprise connecting, by the back-body switch, a back-body of said FET with the reference potential when said short circuit situation is detected.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DESCRIPTION

Figure 1A:
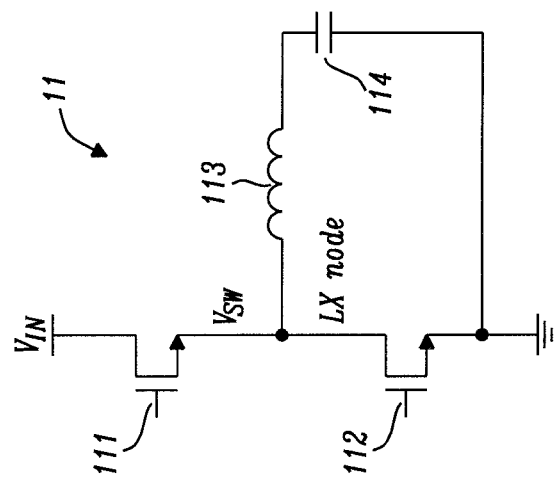
FIGS. 1A and 1B show a buck converter and its graph.
Figure 1B:
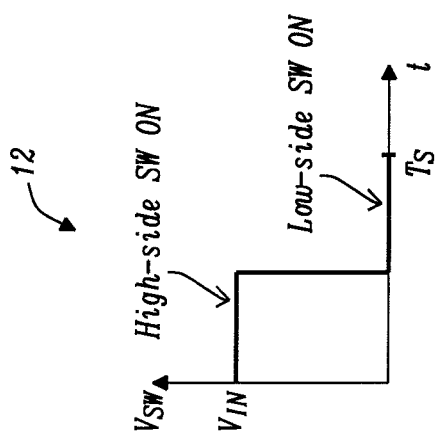

FIG. 1A shows a buck converter 11 which is known from the prior art. Historically, the buck converter topology has been widely deployed for battery operated devices where the input voltage source is provided by a universal serial bus USB-type adapter. A high-side switch 111 is arranged between an inductor input node of inductor 113 and an input voltage. A low-side switch 112 is arranged between said inductor input node and ground. Finally, an output capacitor 114 is arranged between an inductor output node of inductor 113 and ground. In addition, diagram 12 in FIG. 1B illustrates the voltage $V_{SW}$ at the inductor input node of inductor 113 over time. During a first time interval, the high-side switch 111 is turned on and during a second time interval, the low-side switch 112 is turned on. The two switches are placed in the ON state in alternating cycles, and the duty cycle of each cycle provides the required output voltage regulation.

In order to increase the operational efficiency of the buck converter, much effort has been placed into reducing the ON time resistance of the switches (i.e. the drain-source-resistance Rds-on) in order to reduce losses. Unfortunately, once the output field-effect transistor FET gate overdrive is maximized, reducing the drain-source-resistance Rds-on results in a greater parasitic capacitance, resulting in a trade-off between conduction losses and switching losses.

Another issue regarding standard buck converters highlighted in FIG. 1 is that the voltage $V_{SW}$ at the inductor input node of inductor 113 swings between the input voltage Vin (when the high-side switch is ON), and ground (when the low-side switch is ON). This results in substantial switching losses of the power converter and core loss dissipated by the inductor due to the high root mean square RMS voltage across the inductor.

Figure 2B:
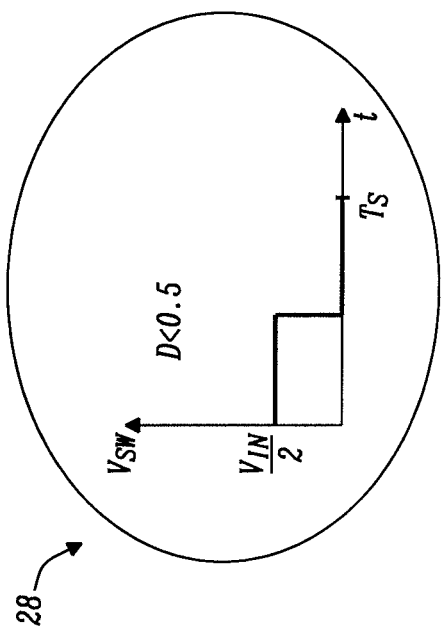
FIGS. 2A, 2B and 2C show a multi-level buck converter and its graphs.
Figure 2C:
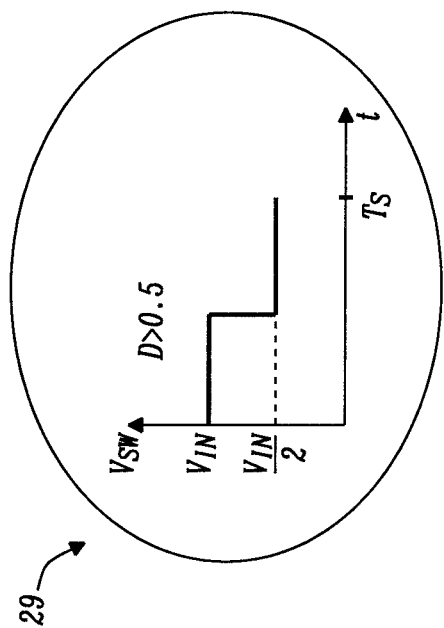
Figure 2A:
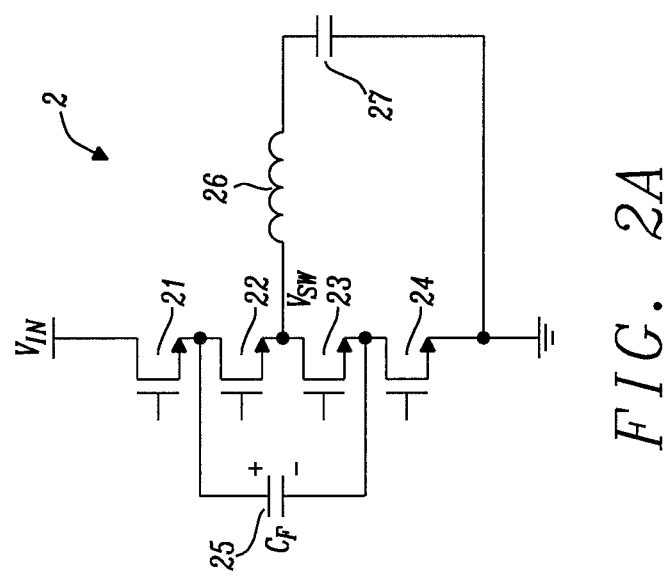
Figure 3A:
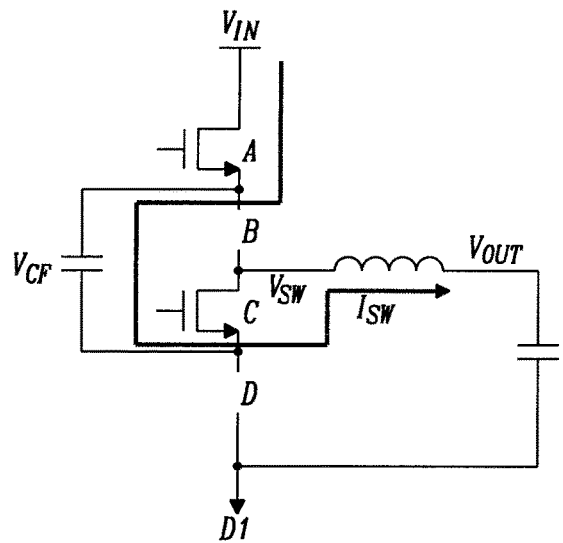
FIGS. 3A, 3B, 3C and 3D show different switching states of a multi-level buck converter.
Figure 3B:
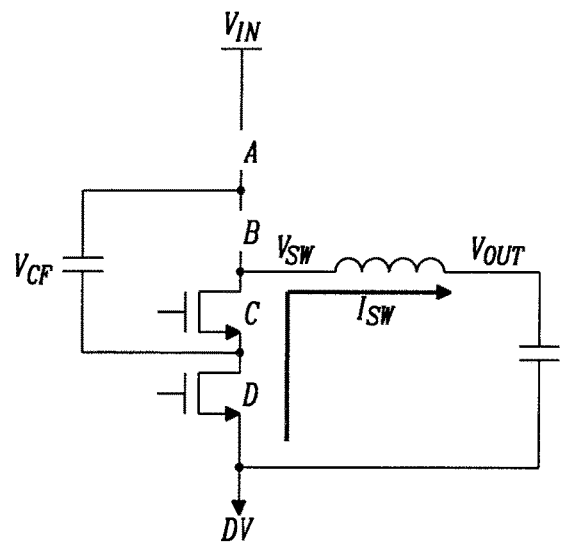
Figure 3C:
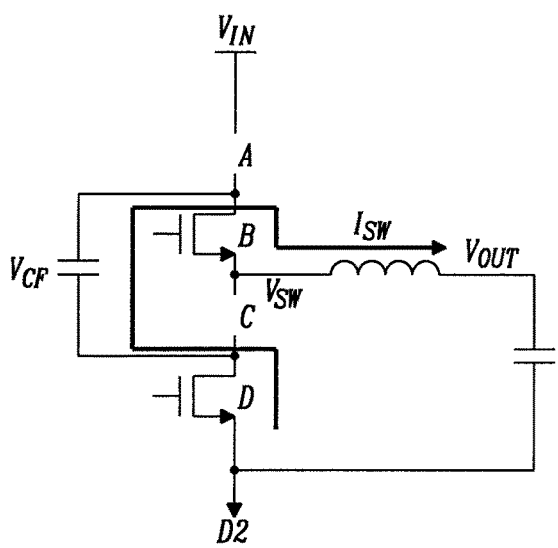
Figure 3D:
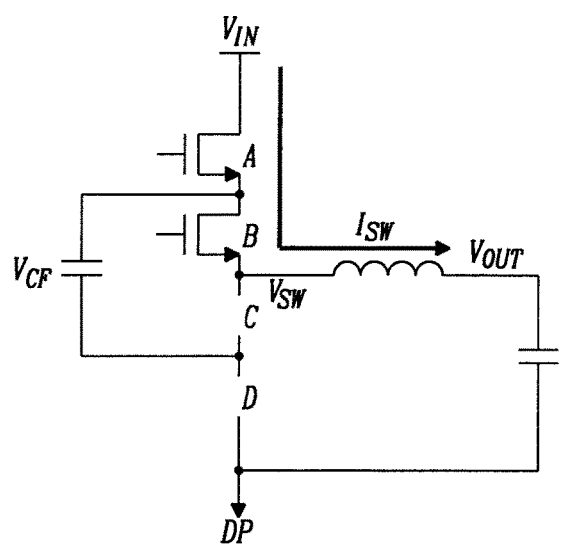

A topology that holds promise to alleviate many of the shortcomings of the buck converter is the multi-level buck converter 2, as shown in FIG. 2A. The illustrated, exemplary multi-level buck converter 2 comprises a first switching element 21, a second switching element 22, a third switching element 23, a fourth switching element 24, an inductor 26, a flying capacitor 25, and an optional output capacitor 27. A first terminal of said inductor 26 may be connected to a switching terminal connecting the second switching element 22 and the third switching element 23. A first terminal of said flying capacitor 25 may be connected to a terminal connecting the first switching element 21 and the second switching element 22, and a second terminal of said flying capacitor 25 may be connected to a terminal connecting the third switching element 23 and the fourth switching element 24.

The voltage $V_{SW}$ at the first terminal of said inductor 26 may switch between V_IN and V_IN/2, if V_IN>V_OUT>V_IN/2, and may switch between V_IN/2 and ground, if V_IN/2>V_OUT>ground, wherein V_IN denotes the input voltage and V_OUT denotes the output voltage. Diagrams 28 in FIG. 2B and 29 in FIG. 2C show the voltage $V_{SW}$ at the first terminal of said inductor 26 over time for the two different duty cycles.

A major aspect of the multi-level buck topology is that the RMS voltage at the first terminal of the inductor 26 is 50% of the corresponding voltage of a traditional buck converter. In addition to reducing the RMS voltage and RMS current across and through the inductor, the voltage across the switching elements are also reduced, thus lowering switching losses. Furthermore, transistors with lower breakdown voltage ratings typically have lower Rds-on characteristics, reducing conductive losses.

FIGS. 3A, 3B, 3C and 3D show 4 different switching states of a multi-level buck converter. In switching state D1 in FIG. 3A, the first and the third switching elements are turned on, while the second and the fourth switching elements are turned off. In switching state DV in FIG. 3B, the third and the fourth switching elements are turned on, while the first and the second switching elements are turned off. In switching state D2 in FIG. 3C, the second and the fourth switching elements are turned on, while the first and the third switching elements are turned off. Finally, in switching state DP in FIG. 3D, the first and the second switching elements are turned on, while the third and the fourth switching elements are turned off. The arrow denoted with $I_{SW}$ indicates the flow of current delivered to the output of the multi-level buck converter. The voltage over the flying capacitor is denoted as $V_{CF}$.

Some portable devices have the capability of utilizing the internal battery to provide a regulated output to an external device. This is commonly referred to as USB On-The-Go OTG boost. The battery management feature in a mobile device requires a step-down converter to charge the internal battery and a step-up boost converter to provide a regulated output for an external device. Prior art systems employ a single power converter which can be used in multiple modes.

Figure 4:
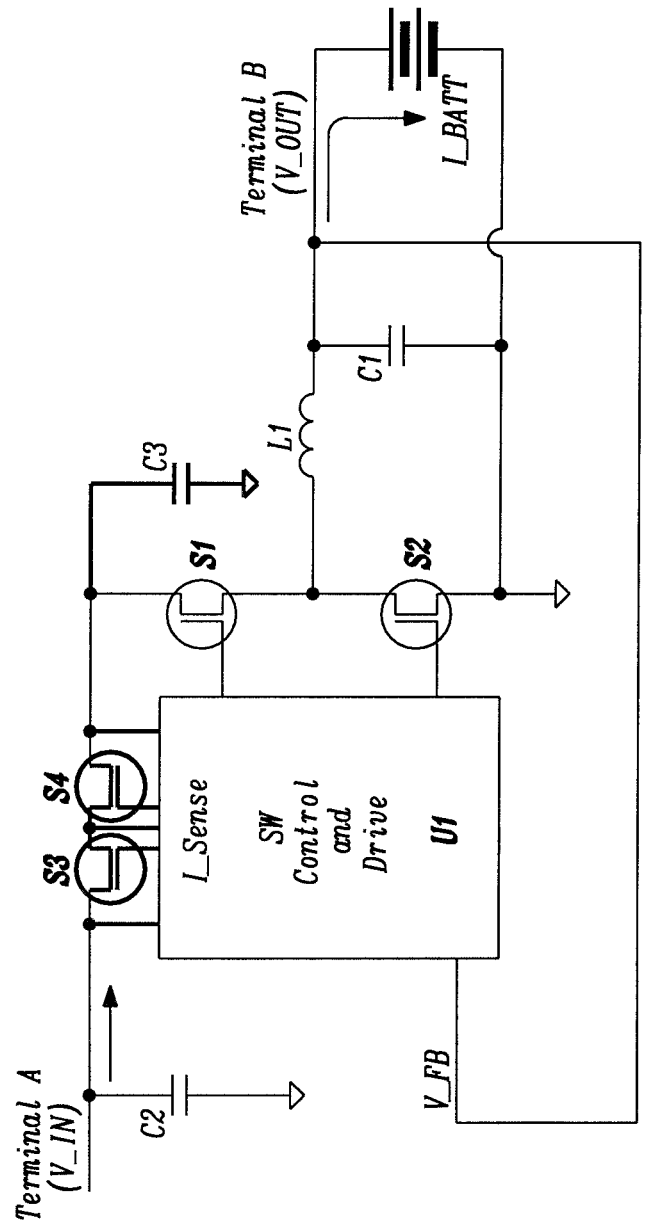
FIG. 4 shows a power converter with USB OTG capability in buck mode.
Figure 5:
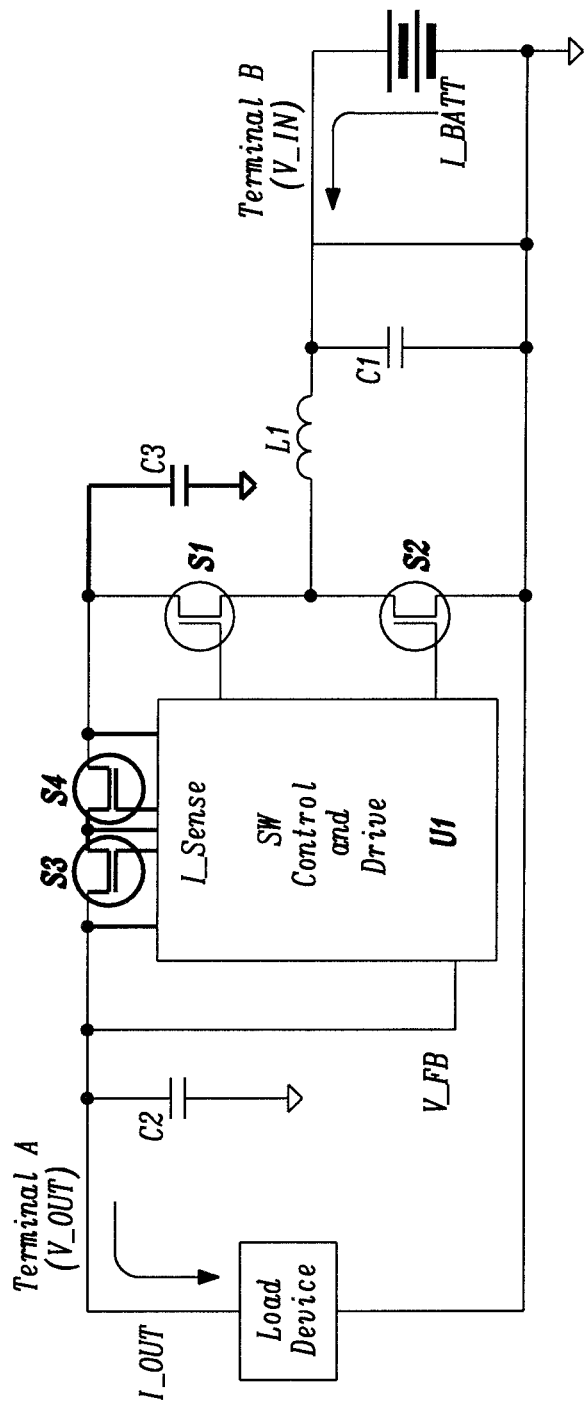
FIG. 5 shows a power converter with USB OTG capability in boost mode.

FIGS. 4 and 5 illustrate a power converter with USB OTG capability. As shown in FIG. 4, when an adapter is connected to Terminal A (input voltage source), the power converter operates in the buck topology mode. Output voltage regulation is provided by controller U1 operating in the buck topology mode, which defines the ON and OFF states of power switches S1 and S2. Controller U1 monitors Terminal B (output voltage) via a voltage feedback signal V_FB.

When disconnected from an input voltage source, the internal battery of the portable device may be used as a power source to an external load. This is illustrated in FIG. 5. In this configuration, Terminal B, coupled to the internal battery, is converted to an input source, and Terminal A is converted to an output voltage terminal for the external load. Output voltage regulation is provided by controller U1 operating in the boost topology mode, which defines the ON and OFF states of power switches S1 and S2. Controller U1 monitors Terminal A (output voltage) via a voltage feedback signal V_FB.

The input voltage for a mobile device's battery charger may be provided by a USB host. The power delivery PD standards (such as e.g. USB PD 3.0) for a USB host limit the maximum "inrush" current that can be supplied when a load is first connected. This standard essentially limits the nominal value of the input capacitance for the charger to not more than 10 µF. Therefore, capacitor C3 shown in FIGS. 4 and 5 is only allowed to be 10 µF or less since it is on the upstream side of the source coupled switches, S3 and S4. Capacitor C3 can be much larger than 10 µF as long as S3 and S4 are used to limit the inrush current. The drawback of having S3 and S4 is that the total FET on-resistance can be relatively high which degrades the charger efficiency.

When operating in the boost mode (FIG. 5), there are a number of factors that must be addressed, which include over-current detection, short protection and output voltage regulation to be compliant with USB standards (+/−5% of 5V). A boost regulator often needs a large output capacitor to handle load transients. The total output capacitance may be the sum of the capacitance values of capacitors C2 and C3. To be more specific, the capacitance connected to Terminal A while operating in the boost mode may be the sum of C2 and C3 when S3 and S4 are in the fully on-state.

While in the reverse charge mode, the output current to the external device must be sensed in order to insure safe operating conditions. A common technique using the protection FETS, S3 and S4, is shown in FIGS. 4 and 5.

As mentioned above, the multi-level buck converter has many advantages over standard buck converters for many applications, including the battery charging function in portable equipment. Also, as mentioned above, many portable devices require the ability to provide a regulated output voltage source to an external load via the USB port.

Figure 6:
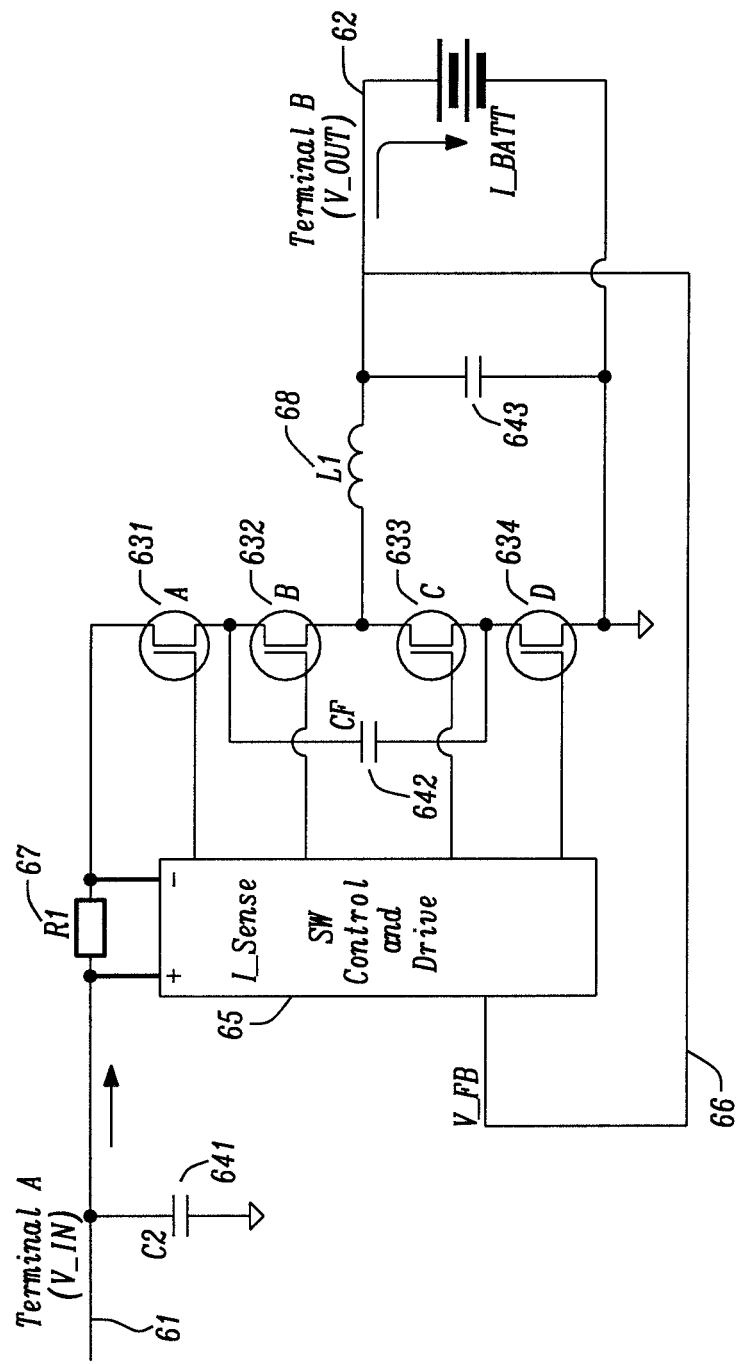
FIG. 6 shows a multi-level power converter with USB OTG capability in buck mode.
Figure 7:
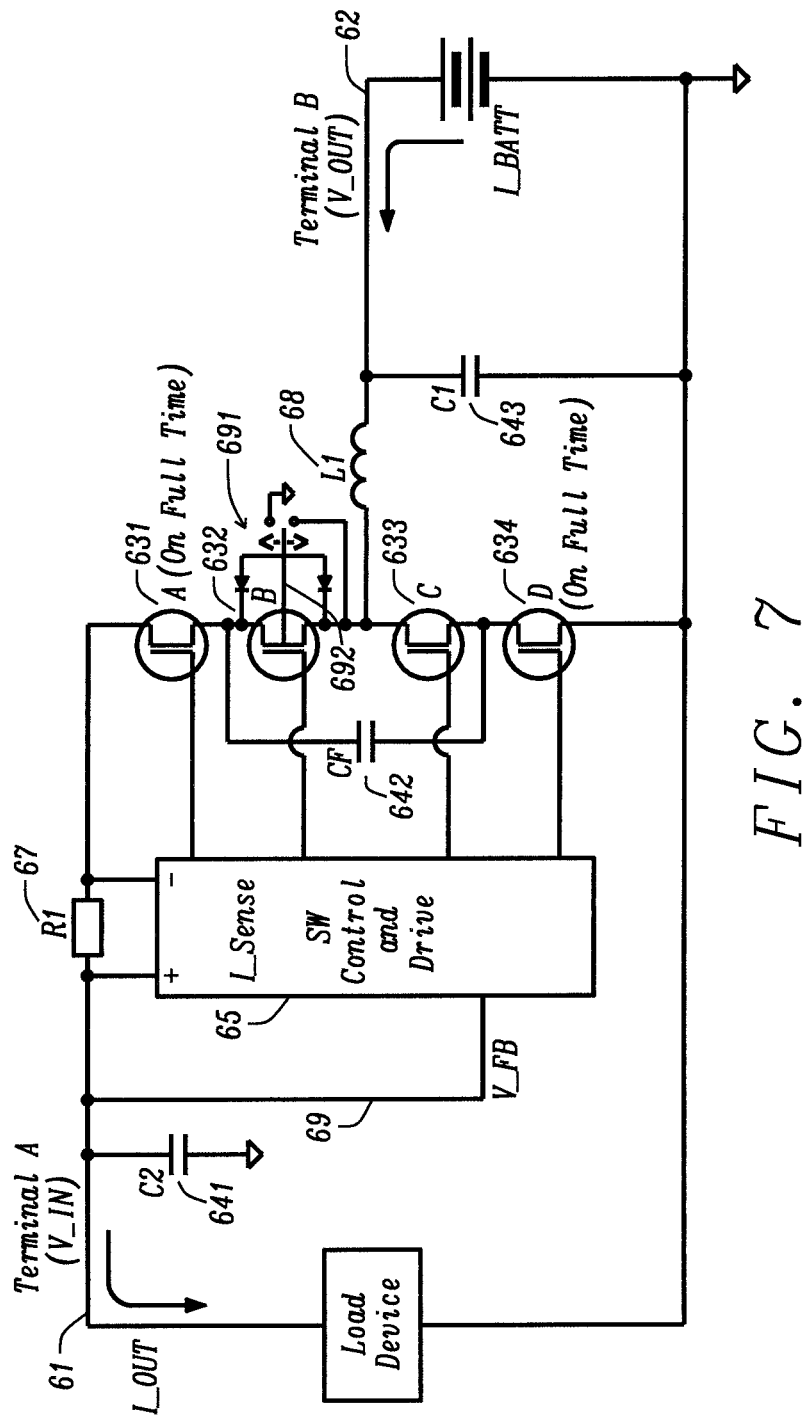
FIG. 7 shows a multi-level power converter with USB OTG capability in boost mode.

FIG. 6 shows an exemplary multi-level power converter according to the present invention in buck mode. FIG. 7 shows the same multi-level power converter according to the present invention in boost mode. The illustrated exemplary power converter is configured to operate either in a buck mode for transferring electrical power from a first terminal 61 of the power converter to a second terminal 62 of the power converter, or in a boost mode for transferring electrical power from the second terminal 62 of the power converter to the first terminal 61 of the power converter. The power converter comprises a first switching element 631 (power switch A), a second switching element 632 (power switch B), a third switching element 633 (power switch C), a fourth switching element 634 (power switch D), a flying capacitor 642, an inductor 68, and a control unit 65. The first switching element 631 is coupled between the first terminal of the power converter and a first terminal of the flying capacitor. The second switching element 632 is coupled between the first terminal of the flying capacitor and a first terminal of the inductor. The third switching 633 element is coupled between the first terminal of the inductor and a second terminal of the flying capacitor. The fourth switching element 634 is coupled between the second terminal of the flying capacitor and a reference potential. The control unit 65 is configured to control the switching elements.

As can be seen in FIGS. 6 and 7, a second terminal of the inductor 68 is coupled to the second terminal 62 of the power converter. The power converter comprises a first capacitor 641 coupled between the first terminal 61 of the power converter and the reference potential. The power converter comprises a second capacitor 643 coupled between the second terminal of the power converter and the reference potential.

FIG. 6 shows a buck feedback loop 66 for coupling the control unit 65 with the second terminal 62 of the power converter, wherein the control unit 65 is configured to regulate, when the power converter operates in the buck mode, an output voltage or an output current at the second terminal of the power converter in the buck mode. FIG. 7 shows a boost feedback circuit 69 for coupling the control unit 65 with the first terminal 61 of the power converter, wherein the control unit 65 is configured to regulate an output voltage or an output current at the first terminal 61 of the power converter when the power converter operates in the boost mode.

Moreover, the power converter comprises a resistor 67 as a current sensing means. As illustrated in FIG. 7, a back-body switch 691 is configured to connect a back-body 692 of the second switching element 632 with a reference potential when said a short circuit situation is detected with the help of resistor 67. More specifically, the control circuit 65 is configured to control the back-body switch such that it connects the back-body 692 with the reference potential when said short circuit situation is detected. When no short circuit situation is detected, said back-body switch 692 is configured to connect the back-body 692 with a source terminal of the second switching element 632.

FIGS. 6 and 7, as compared to FIGS. 4 and 5, illustrate how the present invention may overcome the limitations of the standard buck converter in reverse-boost applications. As shown by FIG. 4, when connected to Terminal A (input voltage source), the power converter operates in the multi-level buck topology mode. Output voltage regulation is provided by controller U1 operating in the multi-level buck topology mode, which defines the ON and OFF states of power switches A, B, C and D. Controller U1 monitors Terminal B (output voltage) via a voltage feedback signal.

When disconnected from an input voltage source, the internal battery of the portable device may be used as a power source to an external load device. This is illustrated by FIG. 7. In this configuration, Terminal B, coupled to the internal battery, is converted to an input source, and Terminal A is converted to an output voltage terminal for the external load device. Power switches A and D are placed in the ON state. Output voltage regulation is provided by controller U1 operating in the reverse-boost topology mode, which defines the ON and OFF state of power switches B and C. Controller U1 monitors Terminal A (output voltage) via a voltage feedback signal.

Further, FIG. 7 illustrates how the reconfigured multi-level buck converter uniquely addresses the shortcomings of prior art reverse boost solutions.

As mentioned above, the required capacitance on Terminal A in the boost mode is large in order to adequately handle load transients and meet USB standard specifications. This necessitated an additional capacitance connected to Terminal A even while operating in the battery charging mode. As shown by FIG. 5, with power switches A and D placed in the ON state, the flying capacitor CF provides additional capacitance from Terminal A to GND (via the Rds-on of switches A and D). As the typical value of CF is sufficient to provide output capacitance in the boost mode, no additional capacitance may be required. Boost startup is done with CF (as Cout)/bootstrap capacitor for Switch A charging which is needed to turn ON Switch A, followed by Switch B bootstrap capacitor charging. This is done by using an internal charge pump circuit. Backbody switched Switch B allows for boost startup control without back-feeding to the OTG output in the absence of the switches S3 and S4.

As mentioned above, while in the boost configuration, the output current to the external load device must be monitored to prevent over-current conditions. As shown in FIG. 4 power switches A and D are placed in the ON state, and power switches B and C are used to create a boost converter in the reverse direction. In this configuration, a sense resistor R1 67 is used to monitor the output current of the boost converter. If the sense resistor 67 is constructed from the IC's metal layers, then a very low value may be achieved. A sense resistor of this type will result in smaller area and lower power loss than the protection switched S3 and S4 shown in FIG. 4 in both the charger (buck) and OTG (boost) mode, resulting in better thermal performance with load. However, using a sense resistor implies that another means is required to disconnect the battery from a short to ground on Terminal A. This means is achieved by controlling the back-body terminal of Switch B which is a symmetrical n-channel FET. For example, if the OTG output (Terminal A) is accidentally shorted to ground, the switch B needs to completed turned off with a modified gate driver scheme, the residual inductor current needs to be discharged through the switch B body diode after which the back body of switch B is moved to ground (from the drain of Switch C to ground) to completely to prevent any back feeding between the battery and the OTG output (Terminal A).

Also, the additional challenge of the OTG boost with the sense resistor is the capability to start into a load as the output voltage reaches a certain level as opposed to starting up into no load when the protection switches S3 and S4 were present as in prior art.

With the above sense resistor approach at the input of the buck for a charging application, the input capacitor (C3) has to be the minimum 10 µF which is dictated by the inrush USB requirement. Now, the CF comes in handy and helps with the increased output capacitance that is needed for the boost mode. So, the efficiency in the forward and reverse direction of the charger and OTG is significantly enhanced.

In conclusion, a novel way to increase the boost output capacitance without the need for additional components is presented. In particular, the flying capacitor 642 of the multi-level buck converter can be used as the boost output capacitor. Furthermore, while operating a multi-level buck converter in the boost mode, a low-loss way to implement output current sensing and provide over current protection is presented without requiring extra protection switches, S3 and S4 while still not compromising the boost transient performance due to limited output capacitance and still obey the USB inrush specifications.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A bidirectional power converter configured to switch between
   a buck mode for transferring electrical power from a first terminal of the power converter to a second terminal of the power converter, or in
   a boost mode for transferring electrical power from the second terminal of the power converter to the first terminal of the power converter,
   wherein the power converter comprises a first switching element, a second switching element, a third switching element, a fourth switching element, a flying capacitor, an inductor, and a control unit, wherein
   the first switching element is coupled between the first terminal of the power converter and a first terminal of the flying capacitor,
   the second switching element is coupled between the first terminal of the flying capacitor and a first terminal of the inductor,
   the third switching element is coupled between the first terminal of the inductor and a second terminal of the flying capacitor,
   the fourth switching element is coupled between the second terminal of the flying capacitor and a reference potential,
   the control unit is configured to control the switching elements.

2. The power converter of claim 1, wherein a second terminal of the inductor is coupled to the second terminal of the power converter.

3. The power converter of claim 1, wherein the power converter comprises a first capacitor coupled between the first terminal of the power converter and the reference potential.

4. The power converter of claim 1, wherein the power converter comprises a second capacitor coupled between the second terminal of the power converter and the reference potential.

5. The power converter of claim 1 comprising a buck feedback circuit for coupling the control unit with the second terminal of the power converter, wherein the control unit is configured to regulate, when the power converter operates in the buck mode, an output voltage or an output current at the second terminal of the power converter.

6. The power converter of claim 5, wherein the control unit is configured to regulate said output voltage or said output current by turning the second switching element on and off and by turning the third switching element on and off.

7. The power converter of claim 1, wherein the control unit is configured to turn on the first switching element and the fourth switching element when the power converter operates in the buck mode.

8. The power converter of claim 1 comprising a boost feedback circuit for coupling the control unit with the first terminal of the power converter, wherein the control unit is configured to regulate an output voltage or an output current at the first terminal of the power converter when the power converter operates in the boost mode.

9. The power converter of claim 8, wherein the control unit is configured to regulate said output voltage or said output current by turning the second switching element on and off and by turning the third switching element on and off.

10. The power converter of claim 1, wherein the control unit is configured to turn on the first switching element and the fourth switching element when the power converter operates in the boost mode.

11. The power converter of claim 1, wherein the power converter comprises a current sensing means arranged on a current path between the first terminal of the power converter and the second terminal of the power converter.

12. The power converter of claim 11, wherein the current sensing means comprises a resistor.

13. The power converter of claim 11, wherein the current sensing means is the first switching element.

14. The power converter of claim 11, wherein the control unit is configured
to detect, based on a sense signal generated by the current sensing means, a short circuit situation, and
in response to said detection, to turn off the second switching element.

15. The power converter of claim 14, wherein the second switching element comprises a field-effect transistor FET and a back-body switch configured to connect a back-body of said FET with the reference potential when said short circuit situation is detected.

16. A method of operating a bidirectional power converter, wherein the power converter comprises a first switching element, a second switching element, a third switching element, a fourth switching element, a flying capacitor, an inductor, and a control unit for controlling the switching elements, wherein the first switching element is coupled between the first terminal of the power converter and a first terminal of the flying capacitor, the second switching element is coupled between the first terminal of the flying capacitor and a first terminal of the inductor, the third switching element is coupled between the first terminal of the inductor and a second terminal of the flying capacitor, the fourth switching element is coupled between the second terminal of the flying capacitor and a reference potential, wherein the method can switch between
operating the power converter in a buck mode for transferring electrical power from a first terminal of the power converter to a second terminal of the power converter, or
operating the power converter in a boost mode for transferring electrical power from the second terminal of the power converter to the first terminal of the power converter.

17. The method of claim 16, wherein the control unit is coupled with the second terminal of the power converter using a buck feedback circuit, the method further comprising:
regulating, when the power converter operates in the buck mode, an output voltage or an output current at the second terminal of the power converter.

18. The method of claim 17, further comprising:
regulating said output voltage or said output current by turning the second switching element on and off and by turning the third switching element on and off.

19. The method of any one of claims 16 to 18, further comprising:
turning on the first switching element and the fourth switching element when the power converter operates in the buck mode.

20. The method of claim 16, wherein the control unit is coupled with the first terminal of the power converter using a boost feedback circuit, the method further comprising:
regulating an output voltage or an output current at the first terminal of the power converter when the power converter operates in the boost mode.

21. The method of claim 20, further comprising:
regulating said output voltage or said output current by turning the second switching element on and off and by turning the third switching element on and off.

22. The method of claim 16, further comprising:
turning on the first switching element and the fourth switching element when the power converter operates in the boost mode.

23. The method of claim 16, further comprising:
arranging a current sensing means on a current path between the first terminal of the power converter and the second terminal of the power converter.

24. The method of claim 23, wherein the current sensing means comprises a resistor or wherein the current sensing means is the first switching element.

25. The method of claim 23, further comprising:
detecting, based on a sense signal generated by the current sensing means, a short circuit situation, and
in response to said detection, to turn off the second switching element.

26. The method of claim 25, wherein the second switching element comprises a field-effect transistor FET and a back-body switch, the method further comprising:
connecting, by the back-body switch, a back-body of said FET with the reference potential when said short circuit situation is detected.

* * * * *